United States Patent
Shiuan et al.

(10) Patent No.: US 7,205,957 B2
(45) Date of Patent: Apr. 17, 2007

(54) MECHANISM FOR ADJUSTING THE OPERATIONAL PARAMETERS OF A COMPONENT WITH MINIMAL IMPACT ON GRAPHICS DISPLAY

(75) Inventors: Yi-Fang Michael Shiuan, Saratoga, CA (US); Xinwei Yang, Fremont, CA (US); Jinming Gu, Cupertino, CA (US); Iming Pai, San Jose, CA (US)

(73) Assignee: Via Technologies, Inc., Taipei (TW)

( * ) Notice: Subject to any disclaimer, the term of this patent is extended or adjusted under 35 U.S.C. 154(b) by 451 days.

(21) Appl. No.: 10/643,561

(22) Filed: Aug. 18, 2003

(65) Prior Publication Data
US 2005/0052438 A1    Mar. 10, 2005

(51) Int. Cl.
G09G 5/00        (2006.01)
(52) U.S. Cl. ........................... 345/1.1; 345/213
(58) Field of Classification Search .................. 345/1.1, 345/3.1–3.3, 204, 213–214
See application file for complete search history.

(56) References Cited

U.S. PATENT DOCUMENTS 5,473,385 A * 12/1995 Leske .................... 375/240.26
6,046,709 A *  4/2000 Shelton et al. ............... 345/1.1

* cited by examiner

Primary Examiner—Sumati Lefkowitz
Assistant Examiner—Ke Xiao
(74) Attorney, Agent, or Firm—Bobby K. Truong; Hickman Palermo Truong & Becker LLP

(57) ABSTRACT

A mechanism is disclosed for adjusting one or more operational parameters of a component in such a way that the adjustment has minimal impact on graphics display. When a component (e.g. a processor) wishes to adjust one or more of its operational parameters (e.g. operating clock frequency), it submits a request to a graphics processing mechanism (GPM). In response, the GPM, which controls multiple displays, sends a response to the component at a proper time to cause the component to adjust the operational parameter during a time period in which a first display and a second display are both experiencing a blank period. By coordinating the timing of the adjustment in this way, it is possible to keep the size of a video memory to a minimum.

20 Claims, 3 Drawing Sheets

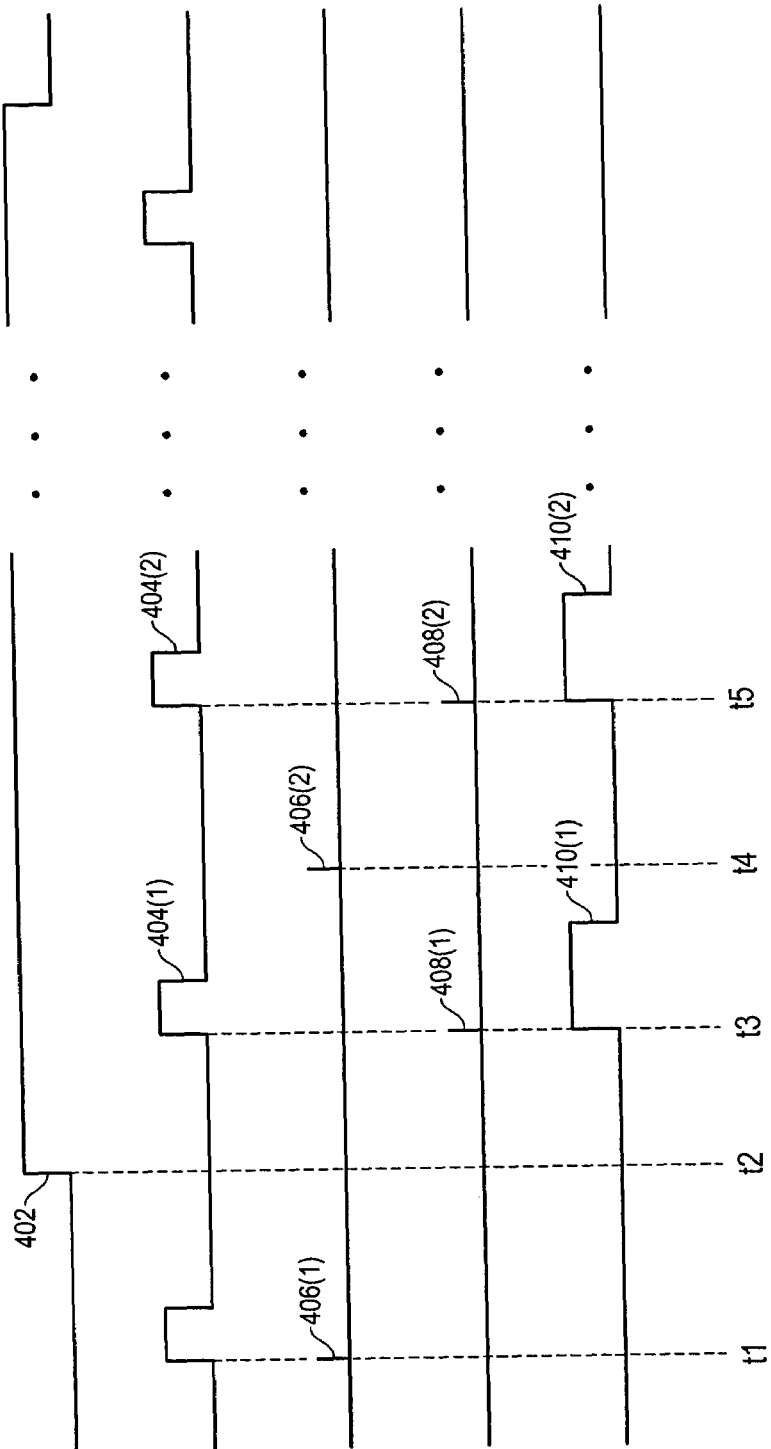

MECHANISM FOR ADJUSTING THE OPERATIONAL PARAMETERS OF A COMPONENT WITH MINIMAL IMPACT ON GRAPHICS DISPLAY

FIELD OF THE INVENTION

This invention relates generally to computer graphics, and more particularly to a mechanism for adjusting the operational parameters of a component with minimal impact on graphics display.

BACKGROUND

Graphics-intensive applications, such as computer aided design (CAD) programs, video games, and real-time video processing applications, are becoming increasingly popular. To meet the graphics demands imposed by such programs, most modern computers include a graphics card (also known as a graphics accelerator card, a video card, a display adapter, etc.). A graphics card provides additional processing capability to perform much of the graphics processing necessary to render an image on a display. By doing so, the graphics card takes much of the graphics-processing burden off of the computer's central processing unit (CPU), which enables the CPU to perform other tasks.

A graphics card typically comprises a specialized processor customized for processing graphics, and a video memory. The specialized processor obtains graphics data from the computer's system memory (which is populated by the CPU), processes and stores the graphics data into the video memory, and provides, at a later time, the graphics data from the video memory to a display for rendering to a user. The video memory, which typically takes the form of a first-in-first-out (FIFO) memory, outputs data at a regular rate to a display to enable the display to render a proper image. In many ways, the video memory can be viewed as a graphics data storage tank, draining at a regular rate from the bottom, and occasionally getting refilled at the top with graphics data from the computer's system memory. In some computer architectures, because the system memory is managed by the CPU, the graphics card cannot access the system memory directly, but rather has to go through the CPU. In such architectures, the graphics card can only access the system memory, and hence, can only refill the video memory with graphics data, when the CPU is available. As will be discussed below, this can impose additional requirements on the graphics card.

In many computer systems, such as portable computer systems (e.g. notebooks, handhelds, laptops, etc.), power consumption is a major concern. To minimize power consumption, some systems dynamically adjust the operational parameters (e.g. operating frequency and power usage) of the CPU to fit the immediate needs. For example, if the CPU is currently doing very little processing, then the CPU lowers its operating frequency to reduce power consumption. On the other hand, if the CPU is executing a processing-intensive application, then it raises its operating frequency to the maximum.

Each adjustment of the operational parameters requires some CPU downtime, during which the CPU is not available. In some systems, there are as many as five (or more) possible operating frequency levels. Typically, each adjustment only changes the operating frequency from the current level to the next higher or lower level. Thus, in a system where there are five frequency levels, to get from the highest level to the lowest level, or vice versa, four adjustments need to be made. During all of these adjustment periods, the CPU is unavailable. Depending on the computer's use pattern, such adjustments can take place on a fairly frequent basis. As a result, in a computer system in which the operational parameters of a CPU are dynamically adjusted, there can be significant CPU downtime.

As a general rule, even when a CPU is experiencing down time, the graphics card still needs to keep providing graphics data to the display. If the graphics card does not do so, the user will experience noticeable and unpleasant "glitches" in the displayed image. Thus, even when the CPU is not available, graphics data is still being drained from the video memory of the graphics card. To prevent the video memory from running out of graphics data, the video memory needs to be refilled. To refill the video memory, the graphics card needs to access the system memory. However, as noted previously, in some architectures, the graphics card cannot access the system memory when the CPU is unavailable. Consequently, in such architectures, the graphics card is caught in a difficult situation: it has to keep providing graphics data from its video memory to a display during CPU downtimes, yet it cannot refill its video memory with graphics data during these downtimes.

To compensate for such a situation, it is possible to increase the size of the video memory to enable the graphics card to store more graphics data to anticipate the CPU downtimes. However, video memory is quite expensive, and increasing the size of the video memory will add significant cost to the graphics card. In the graphics card industry, cost is a major competitive factor; thus, increasing a card's cost will significantly decrease the demand for that card.

SUMMARY

It is observed that there are certain time periods during which a graphics card does not need to provide graphics data to a display. These time periods include, for example, horizontal blank periods and vertical blank periods. A horizontal blank period is the time period between the drawing of the last pixel of a line and the drawing of the first pixel of the next line. A vertical blank period is the time period between the drawing of the last pixel of the last line of a frame and the drawing of the first pixel of the first line in the next frame. If it is timed such that a CPU adjusts its operational parameters during one or more of these blank periods, then data will not be drained (or at least less data will be drained) from the video memory while the CPU is unavailable. As a result, the size of the video memory can be kept to a minimum.

In one embodiment, the above observation is applied in a system in which a graphics module provides pixel data to multiple displays. According to one embodiment, when a component (e.g. a CPU) wishes to adjust one or more of its operational parameters (e.g. operating clock frequency), it submits a request to a graphics processing mechanism (GPM) of the graphics module. Thereafter, the GPM sends a response to the component (CPU) at a proper time to cause the component (CPU) to adjust the operational parameter during a time period in which a first display and a second display are both experiencing a blank period. By coordinating the timing of the adjustment in this way, it is possible to keep the size of the video memory on the graphics module to a minimum.

BRIEF DESCRIPTION OF THE DRAWINGS

FIGS. 4a–4e are sample timing diagrams showing the timing of various signals and blank periods relative to each other.

DETAILED DESCRIPTION OF EMBODIMENT(S)

System Overview

Figure 1:
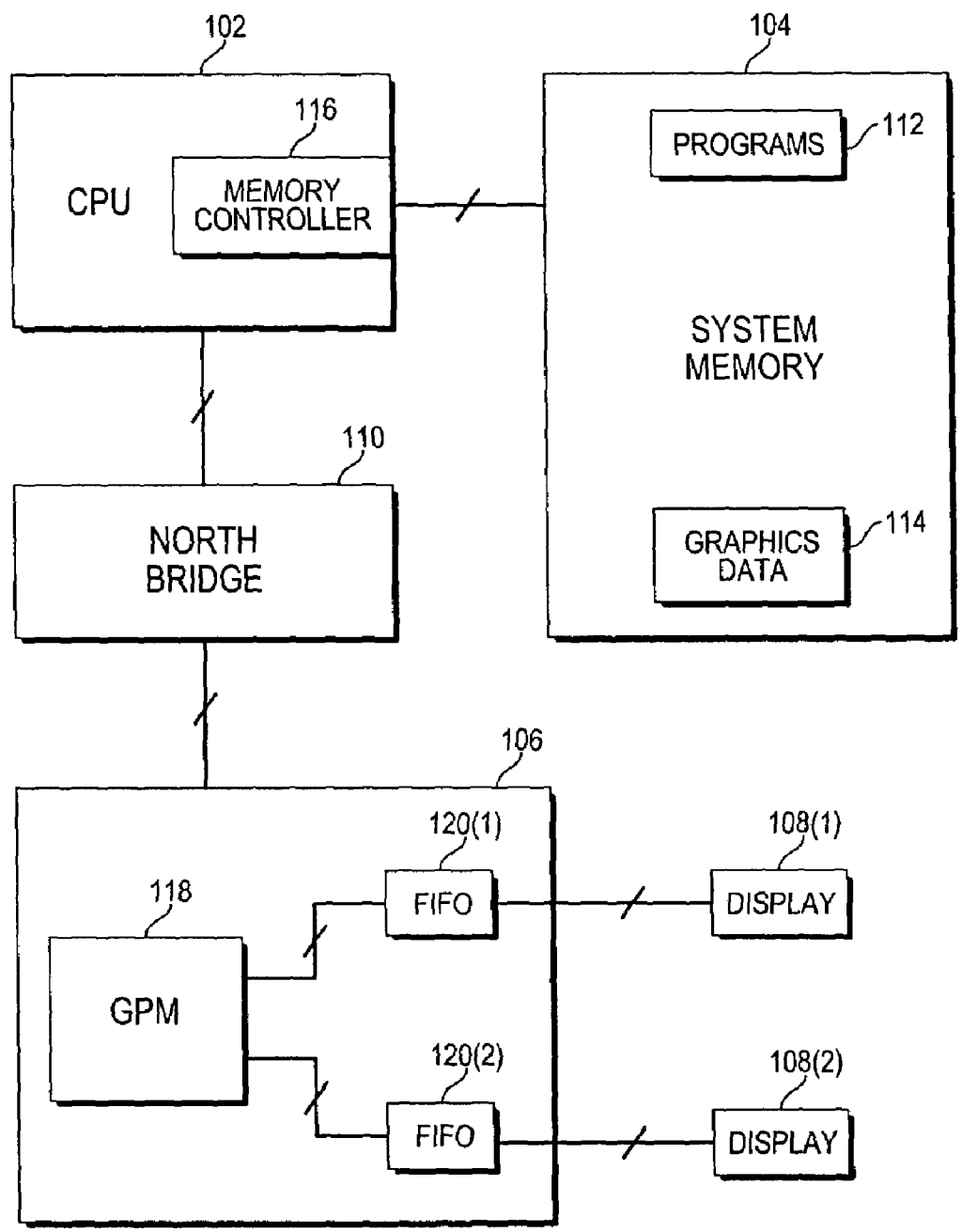
FIG. 1 is a functional block diagram of a system in which one embodiment of the present invention may be implemented.

With reference to FIG. 1, there is shown a sample computer system 100 in which one embodiment of the present invention may be implemented. For the sake of simplicity, only components relevant to the discussion of the present invention are shown in FIG. 1. System 100 may and usually will comprise more components than those depicted.

As shown, system 100 comprises a central processing unit (CPU) 102, a system memory 104, a graphics module 106, a north bridge chipset 110, and a plurality of displays 108. CPU 102 is the component that provides most of the functionality of the system 100. CPU 102 provides this functionality by executing one or more of the programs 112 stored in the system memory 104. In executing these programs 112, CPU 102 may generate graphics data 114 that represents visual information to be displayed to a user. For example, the graphics data may represent a spreadsheet, a digital picture, a word processing document, etc. Such graphics data 114, when generated by CPU 102, is stored in system memory 104. As will be discussed further below, it is this graphics data 114 that is retrieved and processed by graphics module 106, and provided to displays 108 for rendering to a user.

CPU 102 accesses system memory 104 through a memory controller 116. This memory controller 116 enables information to be read from and written to system memory 104. In system 100, the memory controller 116 is incorporated into CPU 102. Thus, in order for other components (e.g. graphics module 106) to access system memory 104, they need to go through CPU 102, which means that CPU 102 needs to be available in order for system memory 104 to be accessed.

As part of its regular operation, CPU 102 executes one of the programs 112 in system memory 104, which causes CPU 102 to monitor the usage of the computer system 100, which may include but is not limited to monitoring the processing load on the CPU 102 itself, and monitoring the usage of other components. If, based upon the current use of system 100, CPU 102 deems it necessary or desirable to adjust one or more of its operational parameters (e.g. its operating clock frequency, its operational voltage, etc.), then CPU 102 may initiate an adjustment operation. In one embodiment, CPU 102 does not do this unilaterally. Rather, as will be explained further below, it interacts with graphics module 106 to coordinate the timing of this adjustment to minimize the effect on graphics display. While the CPU 102 is adjusting its operational parameter, it is unavailable for other processing, which means that the system memory 104 cannot be accessed during that time.

Graphics module 106 interacts with CPU 102 via north bridge 110. Basically, north bridge 110 acts as an interface to enable various peripherals, including graphics module 106, to communicate with CPU 102. In FIG. 1, graphics module 106 is shown as a separate component. As an alternative, graphics module 106, or at least its functionality, may be incorporated into north bridge 110. This and other implementations are within the scope of the present invention.

In one embodiment, graphics module 106 comprises a graphics processing mechanism 118 and a plurality of video memories 120, shown in FIG. 1 as being of the FIFO type. For the sake of example, only two memories 120 are shown in FIG. 1; however, it should be noted that graphics module 106 may comprise any number of memories 120, with each memory 120 corresponding to one or more displays 108. In one embodiment, it is the memories 120 that supply pixel data to the displays 108 to enable the displays 108 to render visual images to a user. Each memory 120 may contain different pixel data such that the different displays 108 may render completely different images.

The displays 108 may be of any type, including but not limited to cathode ray tube (CRT), flat panel, liquid crystal, and plasma. The various displays 108 may be of the same type, or of different types (e.g. displays 108(1) and 108(2) may both be CRT's, both flat panels, one CRT and one flat panel, etc.). In one embodiment, each display 108 renders a visual image using a line-by-line methodology. That is, a display 108 receives pixel data from its corresponding memory 120, and uses that pixel data to draw a horizontal line of pixels across the screen of the display. When the display 108 completes that line of pixels, it draws the next horizontal line of pixels. This continues until all of the horizontal lines of the display have been drawn to render a complete frame. At that point, the display 108 goes back to the screen top of the display, and begins drawing the first horizontal line of the next frame. In this manner, visual images are rendered line-by-line, frame-by-frame.

With this type of rendering methodology, there are certain time periods during which pixels are not being drawn by the display 108. During such time periods, the memory 120 corresponding to that display 108 does not need to provide any pixel data. These time periods, referred to herein as blank periods, include a horizontal blank period and a vertical blank period. A horizontal blank period is the time period between the drawing of the last pixel of a horizontal line and the drawing of the first pixel of the next horizontal line. A vertical blank period is the time period between the drawing of the last pixel of the last horizontal line of a frame and the drawing of the first pixel of the first horizontal line in the next frame. Since no pixel data needs to be provided during these blank periods, if it is timed such that CPU 102 adjusts its operational parameters during one or more of these blank periods, then pixel data will not be drained (or at least less data will be drained) from the memories 120 while the CPU 102 is unavailable (due to the fact that it is implementing the operational parameter adjustment). As a result, the size of the video memories 120 can be kept to a minimum. In one embodiment, the GPM 118 of the graphics module 106 interacts with the CPU 102 to coordinate the timing of the CPU's operational parameter adjustment to ensure that the adjustment takes place, at least partially, during blank periods.

In addition to coordinating the timing of the CPU's operational parameter adjustment, the GPM 118, in one embodiment, also performs several other functions. One function is to interact with CPU 102, via north bridge 110, to access system memory 104 to obtain the graphics data 114 therefrom. Another function is to process this graphics data to place it in a pixel data form that the displays 108 can process. For purposes of the present invention, GPM 118 may perform any type of processing, or no processing at all, on the graphics data to place it in a pixel data form. Yet another function performed by GPM 118 is to store the pixel data into the proper memories 120. In addition, GPM 118 controls the operation of the displays 108. More specifically, GPM 118 controls when the displays 108 draw horizontal lines, when they transition from horizontal line to horizontal line, when they transition from a current frame to a next frame, etc. As a result, GPM 118 knows when each display 108 is experiencing a blank period. This knowledge enables GPM 118 to coordinate CPU's 102 operational parameter adjustment to coincide with the displays' blank periods.

For purposes of the present invention, the functionality of GPM 118 may be implemented using any known technology. For example, GPM 118 may be implemented using hardware logic components (e.g. GPM 118 may be an application specific integrated circuit). Alternatively, the functionality of GPM 118 may be implemented in software, whereby GPM 118 takes the form of a processor executing instructions. These and all other implementations of GPM 118 are within the scope of the present invention.

Sample Operation

Figure 2:
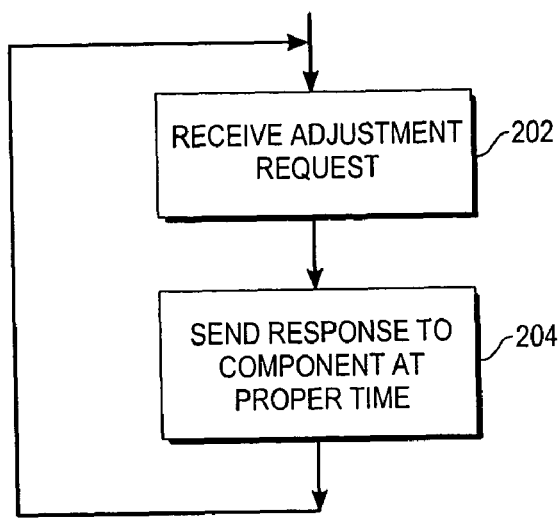
FIG. 2 is a flow diagram illustrating the operation of the GPM of FIG. 1 in accordance with one embodiment of the present invention.
Figure 3:
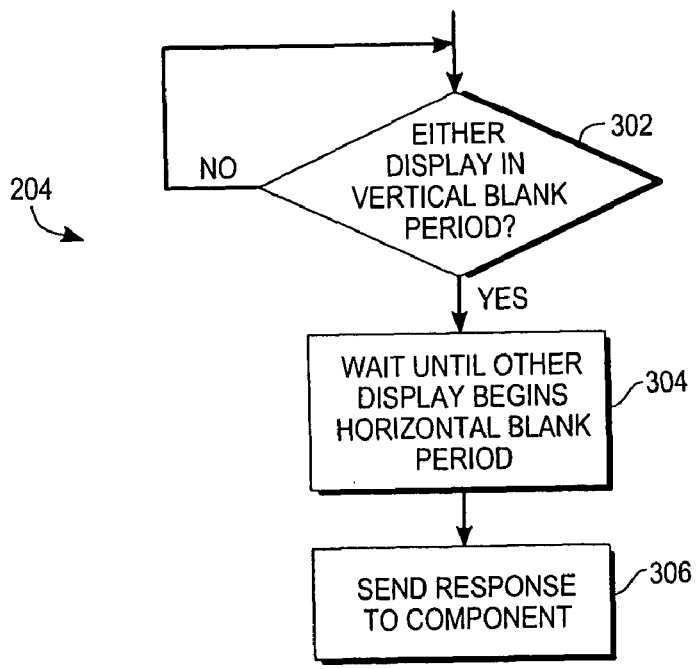
FIG. 3 is a flow diagram illustrating block 204 of FIG. 2 in greater detail.

With references to FIGS. 2 and 3, a sample operation of system 100 in accordance with one embodiment of the present invention will now be described. FIG. 2 shows a high level flow diagram illustrating the operations performed by GPM 118 in coordinating the timing of an operational parameter adjustment of the CPU 102. FIG. 3 shows the operations performed in block 204 of FIG. 2 in greater detail.

As noted previously, CPU 102 can adjust one or more of its operational parameters in response to current system usage and conditions. One of the operational parameters that the CPU 102 can adjust is its operating clock frequency. In one embodiment, when CPU 102 determines that an adjustment of an operational parameter is necessary or desirable, it sends an adjustment request to GPM 118. It then waits for a response. Until it receives a response from GPM 118, CPU 102 makes no adjustment to the operational parameter, and continues operating as normal.

When GPM 118 receives (block 202 of FIG. 2) an adjustment request from CPU 102, it determines a proper time for sending a response. In one embodiment, the timing of the response is chosen such that it causes CPU 102 to adjust the operational parameter during a time period in which display 108(1) and display 108(2) are both experiencing a blank period. By choosing the timing of the response in this way, GPM 118 takes advantage of the blank periods of both displays. After the proper time is determined, GPM 118 sends (block 204) a response to CPU 102 at the proper time. Upon receiving the response, CPU 102 initiates adjustment of the operational parameter. Because the timing of the response was strategically selected, CPU 102 will implement its operational parameter adjustment, at least partially, while both displays 108(1), 108(2) are experiencing blank periods. By "at least partially", it is meant that CPU 102 need not start and complete the adjustment process within the time period that both displays 108(1), 108(2) are experiencing blank periods. So long as some part of the adjustment process period overlaps with the time period in which both displays 108(1), 108(2) are experiencing blank periods, the blank periods are used advantageously to reduce the size of the memories 120 (FIG. 1).

FIG. 3, which is an elaboration of block 204 of FIG. 2, shows in greater detail one possible process used by GPM 118 to determine the proper time for sending the response to CPU 102. As shown, GPM 118 determines the proper time by first determining (block 302) whether either display 108 is currently experiencing a vertical blank period. If not, GPM 118 waits. When GPM 118 detects that one of the displays (assume for the sake of example that it is display 108(1)) is experiencing a vertical blank period, GPM 118 then waits (block 304) until the other display (display 108(2) in this example) begins experiencing a horizontal blank period. When that happens, GPM 118 sends (block 306) a response to the CPU's adjustment request. Assuming that CPU 102 begins its adjustment operation as soon as it receives the response, the adjustment operation will be implemented, at least partially, while both displays 108 are experiencing blank periods. Thus, the blank periods are advantageously exploited.

To show an example of this determination process at work, reference will be made to the sample timing diagrams of FIGS. 4a–4e. FIG. 4a shows a sample vertical blank period 402 experienced by display 108(1). FIG. 4b shows some sample horizontal blank periods 404 experienced by display 108(2). Notice that a vertical blank period 402 is typically much longer than a horizontal blank period 404, lasting at least several horizontal line periods. FIG. 4c shows some sample adjustment requests 406 sent by CPU 102. FIG. 4d shows some sample responses 408 sent by GMP 118, and FIG. 4e shows some sample adjustment periods 410 of the CPU 102. These adjustment periods 410 are time periods during which the CPU 102 is adjusting one or more of its operational parameters and, hence, is unavailable.

Referring to FIGS. 4a–4e, suppose that CPU 102 sends an adjustment request 406(1) to GPM 118 at time t1. At this time, neither display is experiencing a vertical blank period. Thus, GPM 118 waits until time t2, at which point display 108(1) begins to experience a vertical blank period 402. After time t2, GPM 118 waits until the other display 108(2) begins to experience a horizontal blank period 404(1). This happens at time t3. At that point, GPM 118 sends a response 408(1) to CPU 102. Upon receiving this response, CPU 102 initiates an adjustment operation to adjust one or more of its operational parameters. This adjustment takes place during the adjustment period 410(1). As shown, adjustment period 410(1) overlaps partially with vertical blank period 402 of display 108(1) and horizontal blank period 404(1) of display 108(2). Thus, these blank periods are used advantageously to reduce the size of the memories 120.

Suppose further that CPU 102 sends another adjustment request 406(2) at time t4. At this time, display 108(1) is already experiencing a vertical blank period 402. Thus, there is no need for the GPM 118 to wait for a vertical blank period. Consequently, GPM 118 immediately waits for a horizontal blank period of display 108(2). Display 108(2) begins experiencing a horizontal blank period 404(2) at time t5; thus, at time t5, GPM 118 sends another response 408(2) to CPU 102. This response causes CPU 102 to initiate another adjustment operation. This adjustment takes place over adjustment period 410(2). Again, adjustment period 410(2) overlaps partially with vertical blank period 402 of display 108(1) and horizontal blank period 404(2) of display 108(2). Thus, the blank periods of the displays 108 are again exploited advantageously.

In the manner described above, CPU 102 can make a series of adjustment requests, and GPM 118 can respond to a series of adjustment requests, within the same vertical blank period 402. If timed properly, CPU 102 can make all of the adjustments needed to get from the lowest operating clock frequency to the highest operating clock frequency (or vice versa) in a single vertical blank period 402.

In FIGS. 4*b* and 4*d*, the GPM 118 is shown as sending responses 408(1), 408(2) in consecutive horizontal blank periods 404(1), 404(2), which causes CPU 102 to implement operational parameter changes 410(1), 410(2) during consecutive horizontal blank periods 404(1), 404(2). This may impose a significant bandwidth limitation on the system memory 104. To relax this bandwidth limitation, GPM 118 may instead send a response to CPU 102 every 2nd, 3rd, 4th . . . horizontal blank period. GPM 118 can use the time in the horizontal blank periods in which a response is not sent to retrieve more graphics data 114 from system memory 104 to prepare for the upcoming unavailability of CPU 102. Waiting longer to send a response, however, reduces the responsiveness of the GPM 118 to the adjustment request. Thus, this is a tradeoff.

In the above example, the responses 408 are shown as being sent right at the beginning of a horizontal blank period 404. It should be noted that this is not required. If so desired, a response 408 may be sent before or after the beginning of a horizontal blank period 404. For example, if there is a delay between the time a response 408 is sent and the time CPU 102 initiates an adjustment operation, it may be desirable to send the response 408 just prior to the beginning of a horizontal blank period 404 so that the CPU 102 can start its adjustment operation prior to or right at the beginning of the horizontal blank period 404. It is also possible to send a response 408 after the beginning of a horizontal blank period 404. This does not allow the full horizontal blank period 404 to be exploited, but it is a possibility nonetheless. So long as a response 408 is sent such that the resulting adjustment period 410 at least partially overlaps with a vertical blank period 402 and a horizontal blank period 404, the blank periods are advantageously exploited.

In the above example, the overlapping blank periods are shown as the vertical blank period of one display and the horizontal blank period of another display. This is not the only type of overlap that can be exploited. In some instances, it is possible for the vertical blank period of one display to overlap with the vertical blank period of another display. If such an overlap does occur, then the overlap can be exploited in a manner similar to that disclosed above. Specifically, a response 408 can be sent by GPM 118 at, prior to, or after the beginning of the second vertical blank period to cause the CPU 102 to implement its operational parameter adjustment during the overlap of the two vertical blank periods. Similarly, it is possible for the horizontal blank period of one display to overlap with the horizontal blank of another display. This overlap can also be exploited in a similar manner to that disclosed above to reduce. These and other implementations are within the scope of the present invention.

In the above example, only two displays are discussed. It should be noted, though, that the concepts taught herein may be applied to any N number of displays, where N is an integer having a value 2 or greater. For example, GPM 118 may coordinate the timing of its response to CPU 102 such that it causes CPU 102 to implement an operational parameter change at a time during which 3, 4, 5 or more displays are all concurrently experiencing blank periods (vertical or horizontal blank periods). This and other applications are within the scope of the present invention.

At this point, it should be noted that although the invention has been described with reference to a specific embodiment, it should not be construed to be so limited. Various modifications may be made by those of ordinary skill in the art with the benefit of this disclosure without departing from the spirit of the invention. For example, the invention may be applied to any component adjusting any operational parameter, not just to a CPU adjusting its operating clock frequency. This and other modifications may be made. Thus, the invention should not be limited by the specific embodiments used to illustrate it but only by the scope of the issued claims.

What is claimed is:

1. A method, comprising:
   receiving a request from a component to adjust an operational parameter of the component; and
   sending a response to the component at a proper time to cause the component to adjust the operational parameter, at least partially, during a particular time period in which a first display is experiencing a vertical blank period and a second display is experiencing a horizontal blank period.

2. The method of claim 1, wherein the component comprises a central processing unit (CPU), and wherein the operational parameter is an operating clock frequency of the CPU.

3. The method of claim 1, wherein the proper time is a time during which the first display is experiencing the vertical blank period and the second display is beginning to experience the horizontal blank period.

4. The method of claim 1, wherein the proper time is a time during which the first display is experiencing the vertical blank period and the second display is about to begin experiencing the horizontal blank period.

5. The method of claim 1, wherein the proper time is a time during which the first display is experiencing the vertical blank period and the second display is experiencing the horizontal blank period.

6. The method of claim 1, wherein sending comprises:
   determining whether the first display is currently experiencing the vertical blank period; and
   in response to a determination that the first display is currently experiencing the vertical blank period, sending the response to the component when the second display begins to experience the horizontal blank period.

7. The method of claim 1, wherein sending comprises:
   determining whether the first display is currently experiencing the vertical blank period; and
   in response to a determination that the first display is currently experiencing the vertical blank period, sending the response to the component when the second display is about to begin experiencing the horizontal blank period.

8. The method of claim 1, wherein sending comprises:
   determining whether the first display is currently experiencing the vertical blank period; and
   in response to a determination that the first display is currently experiencing the vertical blank period, sending the response to the component while the second display is experiencing the horizontal blank period.

9. An apparatus, comprising:
   a mechanism for receiving a request from a component to adjust an operational parameter of the component; and
   a mechanism for sending a response to the component at a proper time to cause the component to adjust the operational parameter, at least partially, during a particular time period in which a first display is experiencing a vertical blank period and a second display is experiencing a horizontal blank period.

10. The apparatus of claim 9, wherein the component comprises a central processing unit (CPU), and wherein the operational parameter is an operating clock frequency of the CPU.

11. The apparatus of claim 9, wherein the proper time is a time during which the first display is experiencing the vertical blank period and the second display is beginning to experience the horizontal blank period.

12. The apparatus of claim 9, wherein the proper time is a time during which the first display is experiencing the vertical blank period and the second display is about to begin experiencing the horizontal blank period.

13. The apparatus of claim 9, wherein the proper time is a time during which the first display is experiencing the vertical blank period and the second display is experiencing the horizontal blank period.

14. The apparatus of claim 9, wherein the mechanism for sending comprises:
   a mechanism for determining whether the first display is currently experiencing the vertical blank period; and
   a mechanism for sending, in response to a determination that the first display is currently experiencing the vertical blank period, the response to the component when the second display begins to experience the horizontal blank period.

15. The apparatus of claim 9, wherein the mechanism for sending comprises:
   a mechanism for determining whether the first display is currently experiencing the vertical blank period; and
   a mechanism for sending, in response to a determination that the first display is currently experiencing the vertical blank period, the response to the component when the second display is about to begin experiencing the horizontal blank period.

16. The apparatus of claim 9, wherein the mechanism for sending comprises:
   a mechanism for determining whether the first display is currently experiencing the vertical blank period; and
   a mechanism for sending, in response to a determination that the first display is currently experiencing the vertical blank period, the response to the component while the second display is experiencing the horizontal blank period.

17. A method, comprising:
receiving a first request from a component to adjust an operational parameter of the component;
sending a first response to the component at a first proper time to cause the component to adjust the operational parameter, at least partially, during a time period in which a first display is experiencing a vertical blank period and a second display is experiencing a first horizontal blank period;
receiving a second request from the component to adjust the operational parameter, wherein the second request is received while the first display is still experiencing the vertical blank period; and
sending a second response to the component at a second proper time to cause the component to adjust the operational parameter, at least partially, during a time period in which the first display is experiencing the vertical blank period and the second display is experiencing a second horizontal blank period;
wherein it is ensured that the first and the second horizontal blank periods are non-consecutive horizontal blank periods.

18. An apparatus, comprising:
a mechanism for receiving a first request from a component to adjust an operational parameter of the component;
a mechanism for sending a first response to the component at a first proper time to cause the component to adjust the operational parameter, at least partially, during a time period in which a first display is experiencing a vertical blank period and a second display is experiencing a first horizontal blank period;
a mechanism for receiving a second request from the component to adjust the operational parameter, wherein the second request is received while the first display is still experiencing the vertical blank period; and
sending a second response to the component at a second proper time to cause the component to adjust the operational parameter, at least partially, during a time period in which the first display is experiencing the vertical blank period and the second display is experiencing a second horizontal blank period;
wherein it is ensured that the first and the second horizontal blank periods are non-consecutive horizontal blank periods.

19. A method, comprising:
receiving a request from a component to adjust an operational parameter of the component; and
sending a response to the component at a proper time to cause the component to adjust the operational parameter, at least partially, during a particular time period in which N displays are all concurrently experiencing a blank period, where N is an integer having a value of 2 or greater, and wherein at least one of the displays is experiencing a vertical blank period and another of the displays is experiencing a horizontal blank period.

20. An apparatus, comprising:
a mechanism for receiving a request from a component to adjust an operational parameter of the component; and
a mechanism for sending a response to the component at a proper time to cause the component to adjust the operational parameter, at least partially, during a particular time period in which N displays are all concurrently experiencing a blank period, where N is an integer having a value of 2 or greater, and wherein at least one of the displays is experiencing a vertical blank period and another of the displays is experiencing a horizontal blank period.

* * * * *